United States Patent
Nagatomo et al.

(10) Patent No.: US 11,460,332 B2
(45) Date of Patent: Oct. 4, 2022

(54) GAS METER

(71) Applicant: Panasonic Intellectual Property Management Co., Ltd., Osaka (JP)

(72) Inventors: Kenji Nagatomo, Kyoto (JP); Yasuo Koba, Nara (JP); Ryuji Iwamoto, Nara (JP); Mitsunobu Enomoto, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/258,184

(22) PCT Filed: Aug. 23, 2019

(86) PCT No.: PCT/JP2019/032941
§ 371 (c)(1),
(2) Date: Jan. 6, 2021

(87) PCT Pub. No.: WO2020/054353
PCT Pub. Date: Mar. 19, 2020

(65) Prior Publication Data
US 2021/0270655 A1  Sep. 2, 2021

(30) Foreign Application Priority Data
Sep. 14, 2018  (JP) .............................. JP2018-172000

(51) Int. Cl.
*G01F 3/22* (2006.01)
*G01F 15/06* (2022.01)
(Continued)

(52) U.S. Cl.
CPC .............. *G01F 3/221* (2013.01); *G01F 15/06* (2013.01); *G08B 21/16* (2013.01); *G08B 31/00* (2013.01); *H04Q 9/00* (2013.01)

(58) Field of Classification Search
CPC ......... G01F 3/221; G01F 15/06; G08B 21/16; G08B 31/00; H04Q 9/00
See application file for complete search history.

(56) References Cited

U.S. PATENT DOCUMENTS

| 8,305,231 B2 * | 11/2012 | Fujii ........................ G01F 1/66 |
| | | 700/282 |
| 10,045,291 B2 * | 8/2018 | Mani ................. H04W 52/0209 |

(Continued)

FOREIGN PATENT DOCUMENTS

| JP | 2002-122460 | 4/2002 |
| JP | 2004-180048 | 6/2004 |

(Continued)

OTHER PUBLICATIONS

Extended European Search Report dated Oct. 7, 2021 for the related European Patent Application No. 19859943.3.

(Continued)

*Primary Examiner* — Mohamed Barakat
(74) *Attorney, Agent, or Firm* — Wenderoth, Lind & Ponack, L.L.P.

(57) ABSTRACT

Gas meter includes shutoff valve, return unit, flow rate measurer, display, communication unit that communicates with an outside, controller, area information setting unit, and area information comparator. The gas meter compares, by area information comparator, a preset area information held in area information setting unit with a specified value of area information added to a remote shutoff instruction received by communication unit, and when the preset area information and the specified value of the added area information match, shutoff valve is closed.

2 Claims, 4 Drawing Sheets

(51) Int. Cl.
  *G08B 21/16* (2006.01)
  *G08B 31/00* (2006.01)
  *H04Q 9/00* (2006.01)

(56) References Cited

U.S. PATENT DOCUMENTS

| | | | |
|---|---|---|---|
| 10,655,068 B2 * | 5/2020 | Hishinuma | ............... G01F 3/22 |
| 2010/0102258 A1 | 4/2010 | Naganuma et al. | |
| 2011/0004353 A1 * | 1/2011 | Yokohata | .............. G01F 15/068 700/282 |
| 2020/0284613 A1 * | 9/2020 | Shiota | .................... G01D 4/004 |

FOREIGN PATENT DOCUMENTS

| | | |
|---|---|---|
| JP | 2010-133916 | 6/2010 |
| JP | 2015-198516 | 11/2015 |

OTHER PUBLICATIONS

International Search Report of PCT application No. PCT/JP2019/032941 dated Oct. 8, 2019.

* cited by examiner

GAS METER

CROSS-REFERENCE TO RELATED APPLICATIONS

This application is a U.S. national stage application of the PCT International Application No. PCT/JP2019/032941 filed on Aug. 23, 2019, which claims the benefit of foreign priority of Japanese patent application No. 2018-172000 filed on Sep. 14, 2018, the contents all of which are incorporated herein by reference.

TECHNICAL FIELD

The present invention relates to a gas meter that remotely closes a shutoff valve by communication.

BACKGROUND ART

Conventional gas meters have been introduced to all households as important safety devices that detect vibration with built-in seismic sensors when an earthquake occurs, and shut off the gas when a predetermined seismic intensity is reached.

Gas supply companies must perform gas leak inspection work after an emergency such as an earthquake, for example, and in the inspection work, it is necessary to close an upstream side of a gas supply and a gas meter on a gas demand side in order to confirm that there is no gas leak in a gas pipe that supplies the gas. As a method of closing the gas meter on the gas demand side, for example, there is a method of forcibly closing the gas meter by remote control from the outside by communication (see, for example, PTL 1).

FIG. 4 is a block diagram illustrating a conventional gas shutoff device described in PTL 1. As illustrated in FIG. 4, external device 114 and fluid shutoff device 102 including communication unit 113, controller 115, and shutoff valve driver 109 are included. Furthermore, fluid shutoff device 102 includes shutoff valve drive controller 118 that receives a signal from controller 115 and controls an operation of shutoff valve driver 109, and pressure determination unit 122 that receives a signal from pressure detector 120 which detects a pressure of a fluid, determines a status regarding the pressure of the fluid, and transmits a signal regarding the determination result to controller 115. Shutoff valve drive controller 118 and pressure determination unit 122 are incorporated in control board 117 together with communication unit 113 and controller 115. Furthermore, control board 117 includes trigger SW 124 that transmits a trigger signal to controller 115, and a battery voltage monitor 123 that monitors a voltage of battery 116 which supplies power to controller 115.

Operations of main components of the conventional gas shutoff device will be described with reference to FIG. 4. Communication unit 113 illustrated in FIG. 4 is configured to perform two-way communication. When communication unit 113 receives remote shutoff/return commands from external device 114, communication unit 113 causes shutoff valve driver 109 to perform shutoff/return drive operations via shutoff valve drive controller 118, and outputs a command reception/execution response to external device 114. With such a configuration, it is possible to confirm with external device 114 that opening/closing operations of shutoff valve driver 109 have been reliably executed.

CITATION LIST

Patent Literature

PTL 1: Unexamined Japanese Patent Publication No. 2010-133916

SUMMARY OF THE INVENTION

However, in the conventional configuration, in order to remotely shut off the gas meter when a signal is received from external device 114, it is necessary to select individual gas meters installed in a gas piping system to be checked about the gas leak, and send remote control instructions to the individual gas meters from a monitoring center or the like. Therefore, there is a problem that it is complicated in terms of management and work to send the remote control instructions while a relationship between the gas pipe and the individual gas meter is confirmed.

The present disclosure provides a gas meter capable of efficiently performing gas leak inspection work of a gas pipe by presetting, for gas meters, area information including gas piping system information, giving an instruction where area information as a closing target is added when gas meters are collectively closed by remote control from a monitoring center, and shutting off the gas meters by focusing on a gas pipe to be inspected.

A gas meter in the present disclosure includes a shutoff valve that shuts off a gas flow, a flow rate measurer that measures a gas flow rate, a return unit that opens the shutoff valve, a display that displays a status, a communication unit that communicates with an outside, an area information setting unit that sets and stores area information related to a gas piping system where the gas meter is installed, and a controller that controls the shutoff valve and each component. Furthermore, when the controller of the gas meter receives, by the communication unit, a remote shutoff instruction where a specified value of area information is added, the controller closes the shutoff valve in a case where the area information stored in the area information setting unit and the specified value of the area information added to the remote shutoff instruction match.

With this configuration, when individual gas meters are shut off by remote control from a monitoring center or the like, it is possible to send a remote shutoff instruction where area information including a gas piping system to be inspected is added. Therefore, the gas meter that has received the remote shutoff instruction compares the added area status (for example, a pipe number of a gas pipe to be inspected) with the area information preset in the gas meter, so that the shutoff valve can be shut off only when the added area information and the preset area information match.

Since the gas meter in the present disclosure presets the area information on the gas piping system or the like, it is possible to collectively send, from the monitoring center, the remote shutoff instruction where the area information matching the gas pipe to be inspected is added, and to easily shut off a gas meter installed in the gas pipe to be inspected, and thus gas leak inspection can be performed efficiently.

In addition, since the fact that the area information has been specified and the gas meter has been forcibly shut off remotely is displayed, it is possible to easily recognize a shut-off event during on-site inspection work, and to perform the gas leak inspection more efficiently.

DESCRIPTION OF EMBODIMENT

Hereinafter, a gas meter in an exemplary embodiment will be described with reference to the drawings.

Exemplary Embodiment

Figure 1:
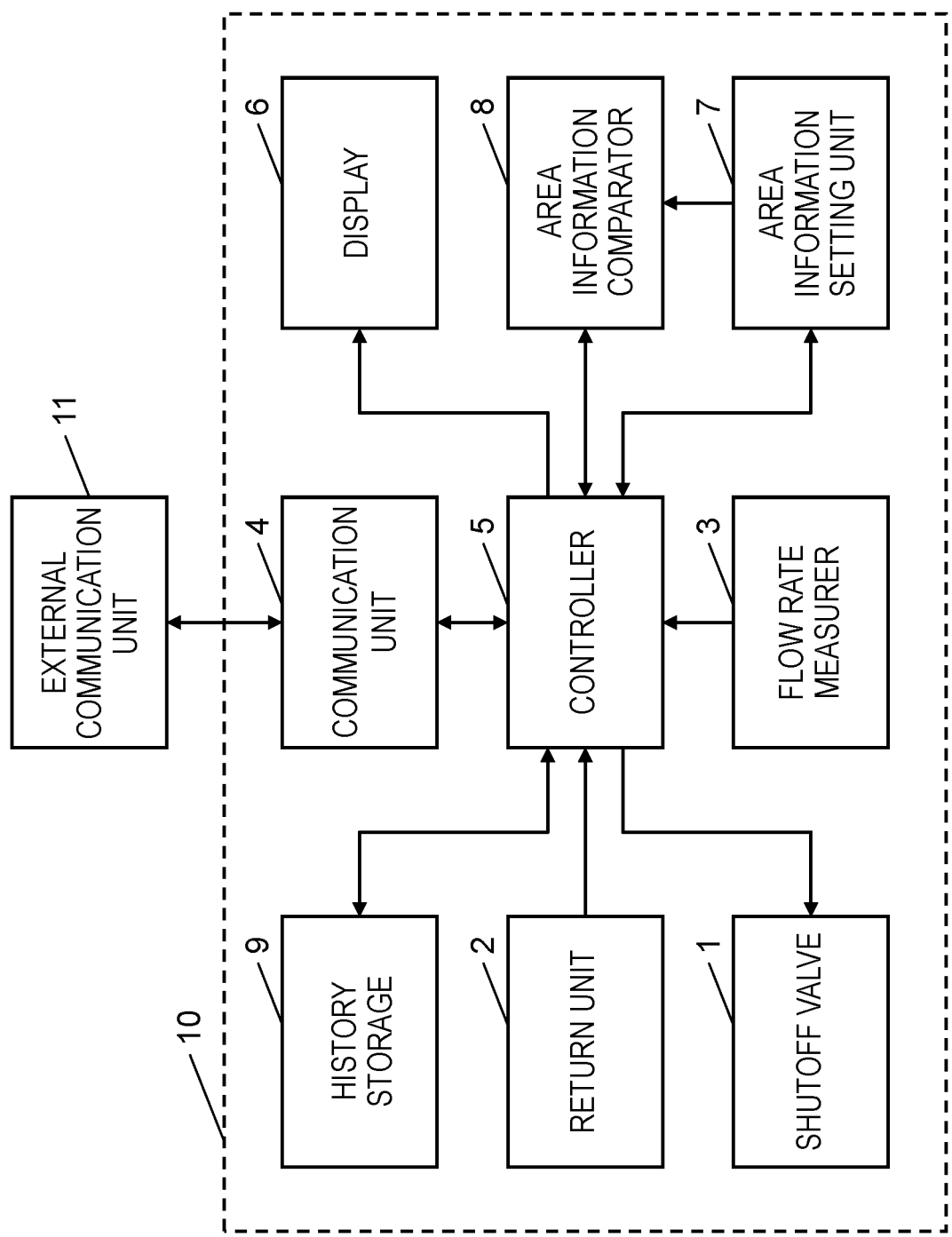
FIG. 1 is a block diagram of a gas meter in an exemplary embodiment.

FIG. 1 is a block diagram of the gas meter in the exemplary embodiment.

In FIG. 1, gas meter 10 includes shutoff valve 1 that shuts off a flow of gas, return unit 2 that transmits a signal to open a closed state of shutoff valve 1, flow rate measurer 3 that measures a gas flow rate, and communication unit 4 that communicates with external communication unit 11. In addition, gas meter 10 includes display 6 that displays various states of gas meter 10, history storage 9 that holds a history of events such as a shutoff of shutoff valve 1, and controller 5 that controls each component of gas meter 10. Furthermore, gas meter 10 includes area information setting unit 7 that receives, by communication unit 4, area information on a gas piping system or the like in which gas meter 10 is installed, and presets and stores the area information by controller 5, and area information comparator 8 that compares, when communication unit 4 receives a remote shutoff instruction, area information in the remote shutoff instruction, which is extracted by controller 5, with the area information held by area information setting unit 7.

Here, external communication unit 11 transmits various commands including the area information from a monitoring center or a setting device to communication unit 4 of gas meter 10 by, for example, wireless communication.

Next, an operation of gas meter 10 of the present exemplary embodiment will be described with reference to FIGS. 1 and 2.

First, setting of the area information on the gas piping system or the like in which gas meter 10 is installed will be described with reference to a diagram of a relationship between gas meters and gas pipes illustrated in FIG. 2.

Figure 2:
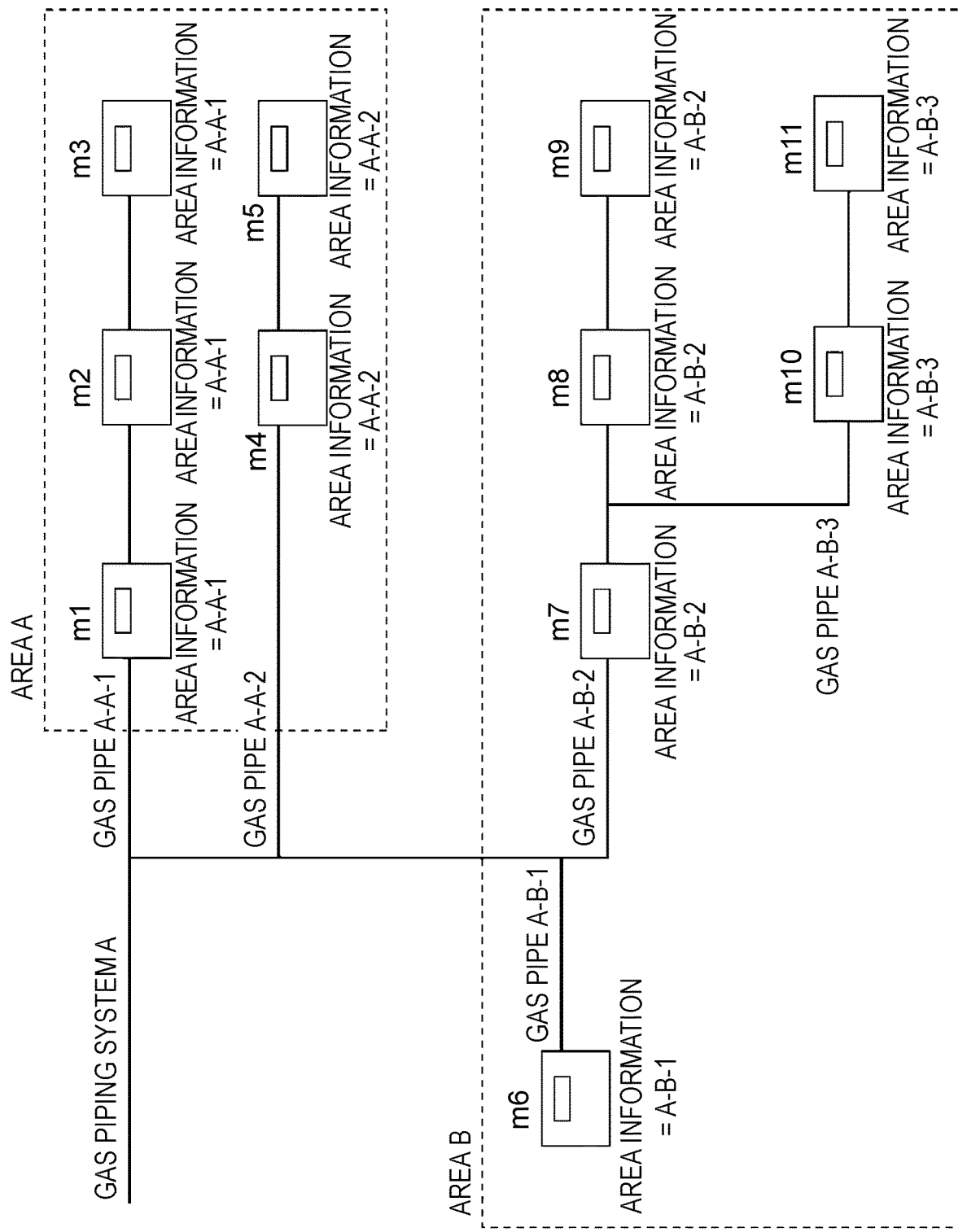
FIG. 2 is a configuration diagram illustrating a relationship between gas meters and gas pipes in the exemplary embodiment.

FIG. 2 illustrates an example of the area information. FIG. 2 illustrates an arrangement relationship between gas pipes and installed gas meters in gas piping system A. Gas piping system A of a plurality of gas piping systems is divided into a plurality of gas pipes (gas pipe A-A-1, gas pipe A-A-2, gas pipe A-B-1, gas pipe A-B-2, and gas pipe A-B-3), and gas meters m1 to m11 each having the same configuration as gas meter 10 illustrated in FIG. 1 are installed in the gas pipes.

As for the area information on the gas piping system or the like in which gas meters m1 to m11 are installed, for example, information "area information=A-A-1" is set in gas meter m1 and information "area information=A-A-2" is set in gas meter m4. The area information is set in the same format for all gas meters m11 to m11.

External communication unit 11 transmits the area information illustrated in FIG. 2 to individual gas meters m1 to m11. When controllers 5 of gas meters m1 to m11 receive, by respective external communication units 11 and communication units 4, commands to set the area information on the gas piping system or the like in which gas meters m1 to m11 are installed, controllers 5 give setting instructions to area information setting units 7 based on the received setting commands, and the area information is stored in area information setting units 7.

By the above operation, the area information on the gas piping system or the like in which gas meters m1 to m11 are installed is preset in gas meters m1 to m11.

Next, remote shutoff control will be described.

External communication unit 11 identifies an area where gas leak inspection work is required after an emergency such as an earthquake, and transmits, to a part of gas meters m1 to m11, which is installed in an area where the shutoff is required, a remote shutoff command where area information to which the part of gas meters m1 to m11 as a shutoff target belongs is added.

In each of gas meters m1 to m11, controller 5 receives the remote shutoff command by external communication unit 11 and communication unit 4, analyzes the received remote shutoff command, extracts the added area information, and gives a comparison instruction to area information comparator 8 for the extracted area information.

Area information comparator 8 receives the comparison instruction, compares the extracted area information with the area information held by area information setting unit 7. When the extracted area information and the preset area information match, area information comparator 8 responds to controller 5 that the extracted area information and the preset area information match. Controller 5 receives the response of the area information match from area information comparator 8 and shuts off shutoff valve 1.

Figure 3:
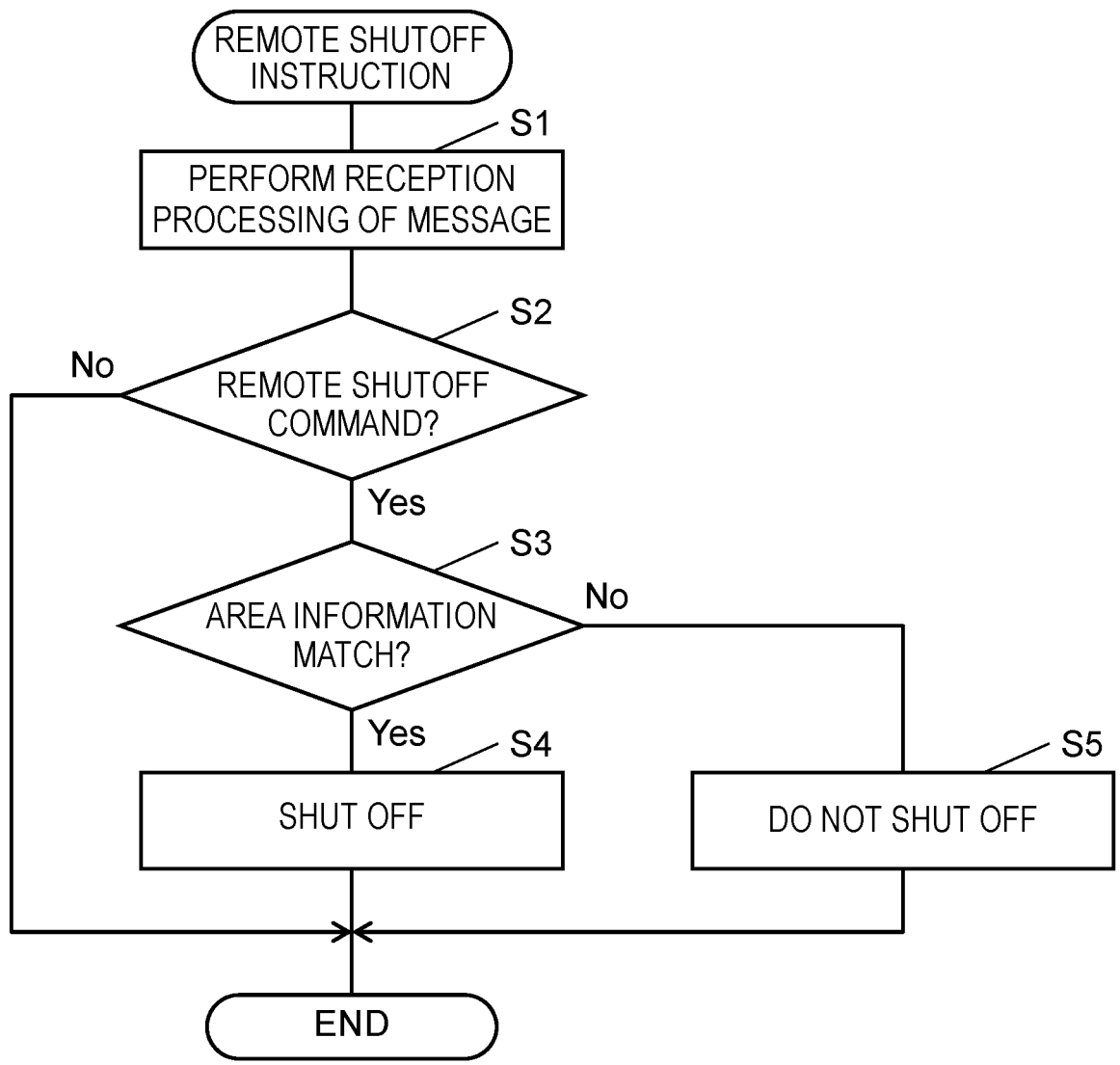
FIG. 3 is a flowchart illustrating an operation at the time of receiving a remote shutoff instruction of the gas meter in the exemplary embodiment.
Figure 4:
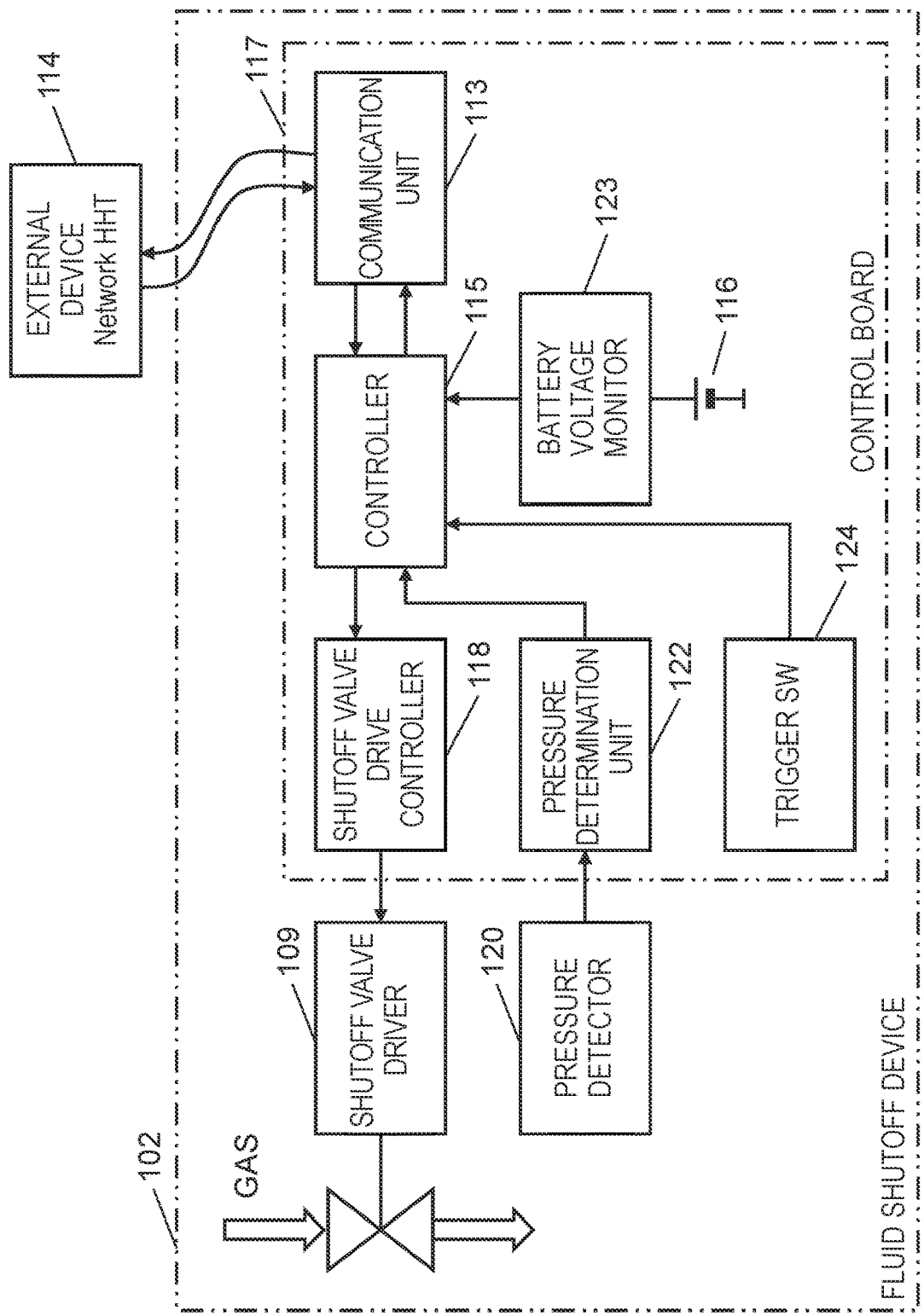
FIG. 4 is a block diagram of a gas meter in a conventional art.

The operation of the above remote shutoff instruction will be described with reference to a flowchart of FIG. 3.

First, communication unit 4 receives a communication message (step S1). Controller 5 determines whether the communication message is a remote shutoff command, and extracts area information if the communication message is the remote shutoff command (step S2). Next, area information comparator 8 compares the area information extracted by controller 5 with area information held by area information setting unit 7 (step S3). As a result of the comparison, if the extracted area information and the preset area information match, shutoff valve 1 is shut off (step S4). On the contrary, if the extracted area information and the preset area information do not match, shutoff valve 1 is not shut off (step S5).

Note that the area information described above does not limit exemplary embodiment, and may be some systematically determined information such as a serial number obtained by assigning a number to an area. Furthermore, the area information may be a method of specifying only an arbitrary plurality of digits of an ID that identifies existing gas meter 10.

As described above, in the present exemplary embodiment, the area information on the gas piping system or the like in which gas meter 10 is installed is preset in area information setting unit 7, and when the remote shutoff instruction where area information is added is received, area information comparator 8 compares the added area information with the preset area information of the gas meter. Shutoff valve 1 is shut off only when the added area information and the preset area information match. With this configuration, it is possible to easily collectively shut off only gas meter 10 as a shutoff target based on area information as a gas leak inspection target by remote control, and it is possible to efficiently perform gas leak inspection.

Furthermore, in the present exemplary embodiment, gas meter 10 includes history storage 9 and display 6. History storage 9 can store the fact that communication unit 4 has received the remote shutoff instruction where a specified value of the area information is added, the area information preset in area information setting unit 7 and the specified value of the area information added to the remote shutoff instruction have matched, and shutoff valve 1 has been closed, and display 6 can display the fact. With such a configuration, if contents displayed on display 6 are confirmed at the site, it is possible to easily recognize the reason why the shutoff state is caused, and if contents of history storage 9 are confirmed, it is possible to confirm an event even after the inspection, so that the gas leak inspection and event management can be performed more efficiently.

Note that, the contents displayed on display 6 and the contents stored on history storage 9 are not limited to the blocking factor, but it is also possible to display the area information itself, and when the blocking factor is an earthquake, it is also possible to display and record, as a guide, information such as the seismic intensity of the earthquake quantitatively or as an image. With such a configuration, the contents displayed on display 6 and the contents stored on history storage 9 can be utilized as information for on-site inspection work and management information for inspection work, and gas inspection work can be performed more efficiently.

As described above, a gas meter in a first disclosure includes a shutoff valve that shuts off a gas flow, a flow rate measurer that measures a gas flow rate, a return unit that opens the shutoff valve, a display that displays a status, a communication unit that communicates with an outside, an area information setting unit that sets and stores area information related to a gas piping system where the gas meter is installed, and a controller that controls each component. Furthermore, when the controller receives, by the communication unit, a remote shutoff instruction where a specified value of area information is added, the controller closes the shutoff valve in a case where the area information stored in the area information setting unit and the specified value of the area information added to the remote shutoff instruction match.

With this configuration, it is possible to easily shut off a gas meter installed in a gas pipe as a gas leak inspection target by remote control, and to efficiently perform gas leak inspection.

In a gas meter in a second disclosure, particularly in the first disclosure, a history storage that holds a history of a shutoff may further be included, and the controller may store, in the history storage unit, a fact that the area information stored in the area information setting unit and the specified value of the area information added to the remote shutoff instruction have matched and the shutoff valve has been closed, and may display the fact on the display.

With this configuration, it is possible to easily recognize a shut-off event during on-site inspection work, and to perform the gas leak inspection more efficiently.

INDUSTRIAL APPLICABILITY

As described above, in a gas meter according to the present invention, it is possible to collectively send, from a monitoring center, a remote shutoff instruction where area information matching a gas pipe to be inspected is added, and to easily shut off a gas meter installed in the gas pipe to be inspected, and thus the gas meter according to the present invention can also be applied to applications such as an electricity meter and a water meter.

REFERENCE MARKS IN THE DRAWINGS

1: shutoff valve
2: return unit
3: flow rate measurer
4: communication unit
5: controller
6: display
7: area information setting unit
8: area information comparator
10, m1-m11: gas meter
11: external communication unit

The invention claimed is:

1. A gas meter from among a plurality of gas meters installed in a gas pipe, the gas pipe being from among a plurality of gas pipes included in a gas piping system, the gas meter comprising:
   a shutoff valve that shuts off a gas flow;
   a flow rate measurer that measures a gas flow rate;
   a return unit that opens the shutoff valve;
   a display that displays a status;
   a communication unit that communicates with an outside;
   an area information setting unit that sets and stores area information related to a gas piping system where the gas meter is installed, the area information being received by the communication unit from an external communication unit, and the area information assigning a same value for each of the plurality of gas meters installed in the gas pipe; and
   a controller that controls the shutoff valve, the flow rate measurer, the return unit, the display, the communication unit, and the area information setting unit, wherein
   when the controller receives, by the communication unit, a remote shutoff instruction where a specified value of area information is added, the controller closes the shutoff valve in a case where the area information stored in the area information setting unit and the specified value of the area information added to the remote shutoff instruction match.

2. The gas meter according to claim 1 further comprising a history storage that holds a history of a shutoff, wherein the controller stores, in the history storage unit, a fact that the area information stored in the area information setting unit and the specified value of the area information added to the remote shutoff instruction have matched and the shutoff valve has been closed, and displays the fact on the display.

\* \* \* \* \*